United States Patent
Huang

(10) Patent No.: US 7,299,399 B2
(45) Date of Patent: Nov. 20, 2007

(54) METHOD AND APPARATUS FOR PARALLELLY PROCESSING DATA AND ERROR CORRECTION CODE IN MEMORY

(75) Inventor: Che-Chi Huang, Shindian (TW)

(73) Assignee: Genesys Logic, Inc., Taipei (TW)

(*) Notice: Subject to any disclaimer, the term of this patent is extended or adjusted under 35 U.S.C. 154(b) by 611 days.

(21) Appl. No.: 10/842,568

(22) Filed: May 11, 2004

(65) Prior Publication Data

US 2004/0243906 A1    Dec. 2, 2004

(51) Int. Cl.
*H03M 13/00* (2006.01)
(52) U.S. Cl. .................... 714/757; 714/772; 714/763
(58) Field of Classification Search ............. 714/757, 714/772, 763
See application file for complete search history.

(56) References Cited

U.S. PATENT DOCUMENTS

| | | | | |
|---|---|---|---|---|
| 5,056,010 A | * | 10/1991 | Huang | ................ 711/4 |
| 5,138,620 A | * | 8/1992 | Miyazaki | ................ 714/775 |
| 5,257,391 A | * | 10/1993 | DuLac et al. | ................ 710/10 |
| 6,332,206 B1 | * | 12/2001 | Nakatsuji et al. | ........... 714/755 |
| 6,986,095 B2 | * | 1/2006 | Maeda et al. | ................ 714/769 |

* cited by examiner

*Primary Examiner*—Joseph D Torres
(74) *Attorney, Agent, or Firm*—Rosenberg, Klein & Lee

(57) ABSTRACT

A method for parallelly processing data and ECC in the memory and associated apparatus are disclosed. The method includes the following steps: (1) reading the first data, and calculating the first syndrome based on the first data and the first ECC code, (2) correcting the first data according to the first syndrome, while reading the second data, and calculating the second syndrome based on the second data and the second ECC code, (3) and correcting the second data according to the second syndrome, while reading the third data and calculating the third syndrome based on the third data and the third ECC code.

14 Claims, 7 Drawing Sheets

METHOD AND APPARATUS FOR PARALLELLY PROCESSING DATA AND ERROR CORRECTION CODE IN MEMORY

BACKGROUND OF THE INVENTION

1. Field of the Invention

The present invention relates to a method and an apparatus for processing an error correction code and, more particularly, to a method and apparatus for parallelly processing data and error correction code in a memory.

2. The Related Arts

Flash memory is widely used in many digital consumer products, such as digital cameras, TV game boxes, flash drives. As the semiconductor fabrication technology improves, the capacity of flash memory also increases significantly. For example, the 32 Mb (mega bytes) flash memory chips manufactured by Samsung comprises 1024 blocks, with each block having 64 pages. In each page, there are 528(=512+16) bytes, wherein 512 bytes are the data area, and 16 bytes are the redundant area. The flash memory is typically accessed by block.

The universal serial bus (USB) ports of a PC can connect various USB devices, such as, a USB keyboard, a USB mouse, a USB card reader, a USB memory flash drive, a USB floppy drive, a USB printer and a USB scanner. The transmission speed also evolves from 12 Mbps in USB1.1 to 480 Mbps in USB2.0.

As the tranceiving speed increases, the speed for accessing the flash memory should be increased. To guarantee the correctness during the speedy access, the flash memory applies the error correction code (ECC) to make sure that the data access is intact.

FIG. 1 of the attached drawings shows a block diagram of a conventional flash memory controller, designated with reference numeral 100. The flash memory controller 100 comprises a direct memory access unit 110, a first-in-first-out (FIFO) memory 120, an ECC calculation unit 130, an exclusive-or gate 140, an I/O FIFO memory 150, and a microprocessor 160. The conventional controller 100 usually accesses the flash memory on a page basis, and generates associated ECC code. Assume that each memory page is 512+16 bytes, where 16 bytes provide a redundancy area for storing system information and associated ECC. For example, ECC is 10 bytes, the following steps show how a direct memory access unit 110 reads a page from the flash memory (not shown): (1) The direct memory access unit 110 reads 512 bytes of data into the FIFO memory 120. (2) The ECC calculation unit 130 calculates an associated syndrome using the 512 bytes data and 10 bytes ECC. (3) The exclusive-or gate 140 corrects error(s) for the 512 bytes of data using the syndrome in step (2). (4) The corrected data are outputted to I/O FIFO memory 150. Furthermore, the direct memory access unit 110 is coupled to and controlled by the microprocessor 160 for memory accessing. Conventionally, the direct memory access unit 110 cannot access the next page until the step of error correction is completed. Hence, access latency exists between the accesses to the different pages.

FIG. 2 shows the corresponding waveform of the operation in FIG. 1. The high in the data signal waveform indicates the data phase corresponding to reading 512 bytes. On the other hand, the high in the ECC signal waveform indicates the ECC phase corresponding to the accessing of the 10 bytes of ECC code. The low in the last portion of both signal waveforms indicates the access latency between accessing two different pages.

SUMMARY OF THE INVENTION

The present invention provides an apparatus for parallelly processing the data and the ECC in an external memory, to be coupled to the external memory and access the same. The present apparatus comprises a microprocessor, an auxiliary control circuit coupling with the microprocessor, a direct memory access unit, a FIFO memory, a first ECC calculation unit, a second ECC calculation unit, and an error correction unit. The direct memory access unit is coupled to the microprocessor for accessing the external memory. The FIFO memory is coupled to the direct memory access unit for temporarily storing the data. The first ECC calculation unit is coupled to the direct memory access unit and the auxiliary control circuit for generating the first syndrome based on the first data and the associated first ECC code. The second ECC calculation unit is also coupled to the direct memory access unit and the auxiliary control circuit. The error correction unit is coupled to the first ECC calculation unit, the second calculation unit, the auxiliary control circuit, and the FIFO memory. The FIFO memory receives the second data and the second ECC calculation unit calculates the second syndrome based on the second data and the associated second ECC code, while the error correction unit corrects the first data in the FIFO memory according to the first syndrome.

The present invention further discloses a USB controller, comprising a ROM pre-recorded with firmware, a RAM, a microprocessor, a direct memory access unit, a FIFO memory, a first ECC calculation unit, a second ECC calculation unit, an error correction unit, an I/O FIFO memory, a serial interface engine, and a USB physical layer circuit. The microprocessor is coupled to the ROM and the RAM. The direct memory access unit is coupled to the non-volatile memory and the microprocessor for accessing the non-volatile memory. The FIFO memory is coupled to the direct memory access unit for temporarily storing data. The first ECC calculation unit is coupled to the direct memory access unit for generating the first syndrome based on the data and the associated first ECC code. The second ECC calculation unit is also coupled to the direct memory access unit. The error correction unit is coupled to the first ECC calculation unit, the second calculation unit, and the FIFO memory. The I/O FIFO memory is coupled to the error correction unit. The serial interface engine is coupled to the I/O FIFO memory, and the USB physical layer circuit is coupled to the serial interface engine for tranceiving a USB differential signal. While the error correction unit corrects data in the FIFO memory according to the first syndrome, the controller reads another data from the non-volatile memory, and the second ECC calculation unit calculates the second syndrome based on the second data and the associated second ECC code.

The present invention further discloses a USB flash drive, comprising a non-volatile memory and a controller. The controller is coupled to the non-volatile memory. The controller preferably comprises a ROM pre-recorded with firmware, a RAM, a microprocessor, a direct memory access unit, a FIFO memory, a first ECC calculation unit, a second ECC calculation unit, an error correction unit, an I/O FIFO memory, a serial interface engine, a USB physical layer circuit. The microprocessor is coupled to the ROM and the RAM. The direct memory access unit is coupled to the non-volatile memory and the microprocessor for accessing the non-volatile memory. The FIFO memory is coupled to the direct memory access unit for temporarily storing data. The first ECC calculation unit is coupled to the direct memory access unit for generating the first syndrome based on the data and the associated first ECC code. The second ECC calculation unit is also coupled to the direct memory access unit. The error correction unit is coupled to the first ECC calculation unit, the second calculation unit, and the FIFO memory. The I/O FIFO memory is coupled to the error correction unit. The serial interface engine is coupled to the I/O FIFO memory, and the USB physical layer circuit is coupled to the serial interface engine for tranceiving a USB differential signal. When the error correction unit corrects data in the FIFO memory according to the first syndrome, the controller reads another data from the non-volatile memory, and the second ECC calculation unit calculates the second syndrome based on the second data and the associated second ECC code.

The present invention also discloses a method for parallelly processing data and ECC in the memory. The method comprises the following steps: (1) reading the first data, and calculating the first syndrome based on the first data and the first ECC code, (2) correcting the first data according to the first syndrome, while reading the second data, and calculating the second syndrome based on the second data and the second ECC code, (3) and correcting the second data according to the second syndrome, while reading the third data, and calculating the third syndrome based on the third data and the third ECC code.

These and other objects, syndromes and advantages of the invention will be apparent to those skilled in the art, from a reading of the following brief description of the drawings, the detailed description of the preferred embodiment, and the appended claims.

DETAILED DESCRIPTION OF THE PREFERRED EMBODIMENTS

Figure 1:
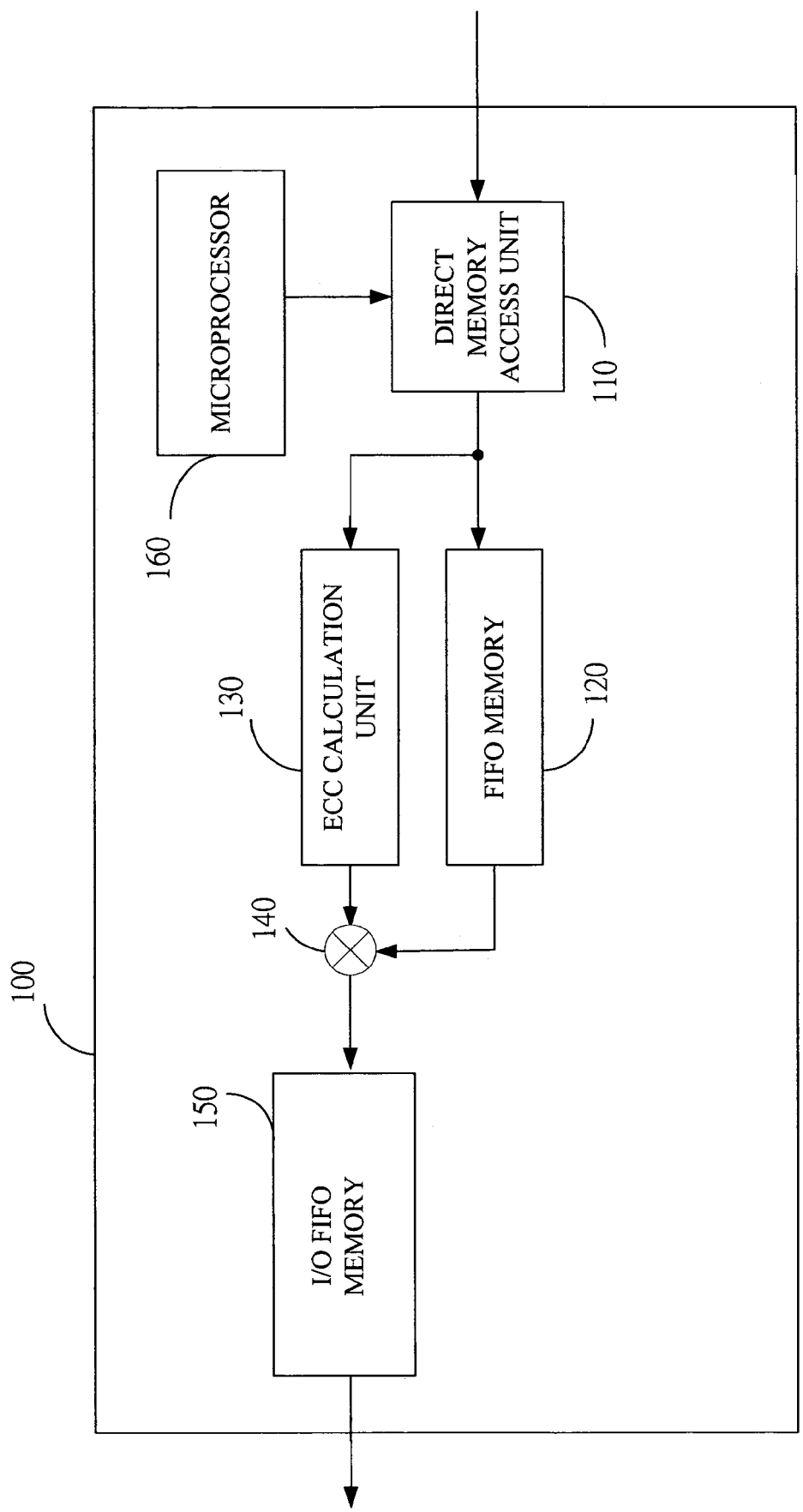
FIG. 1 shows a block diagram of a conventional flash memory controller.
Figure 2:
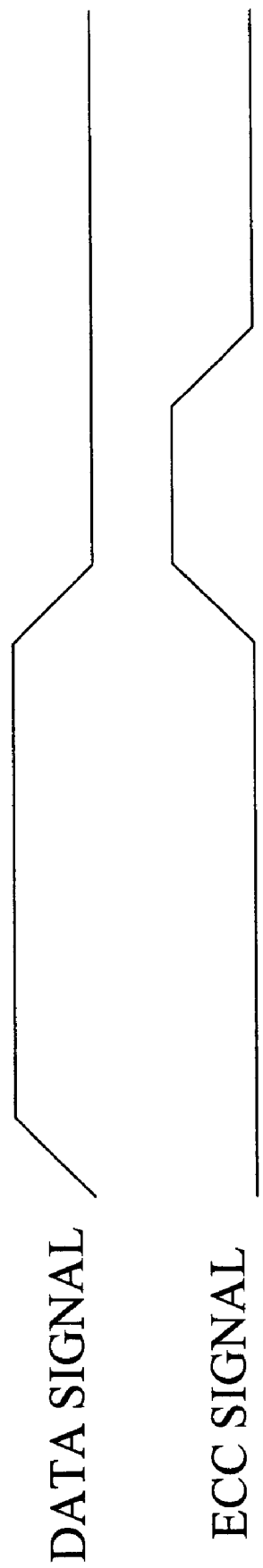
FIG. 2 shows a waveform with reference to FIG. 1.
Figure 3:
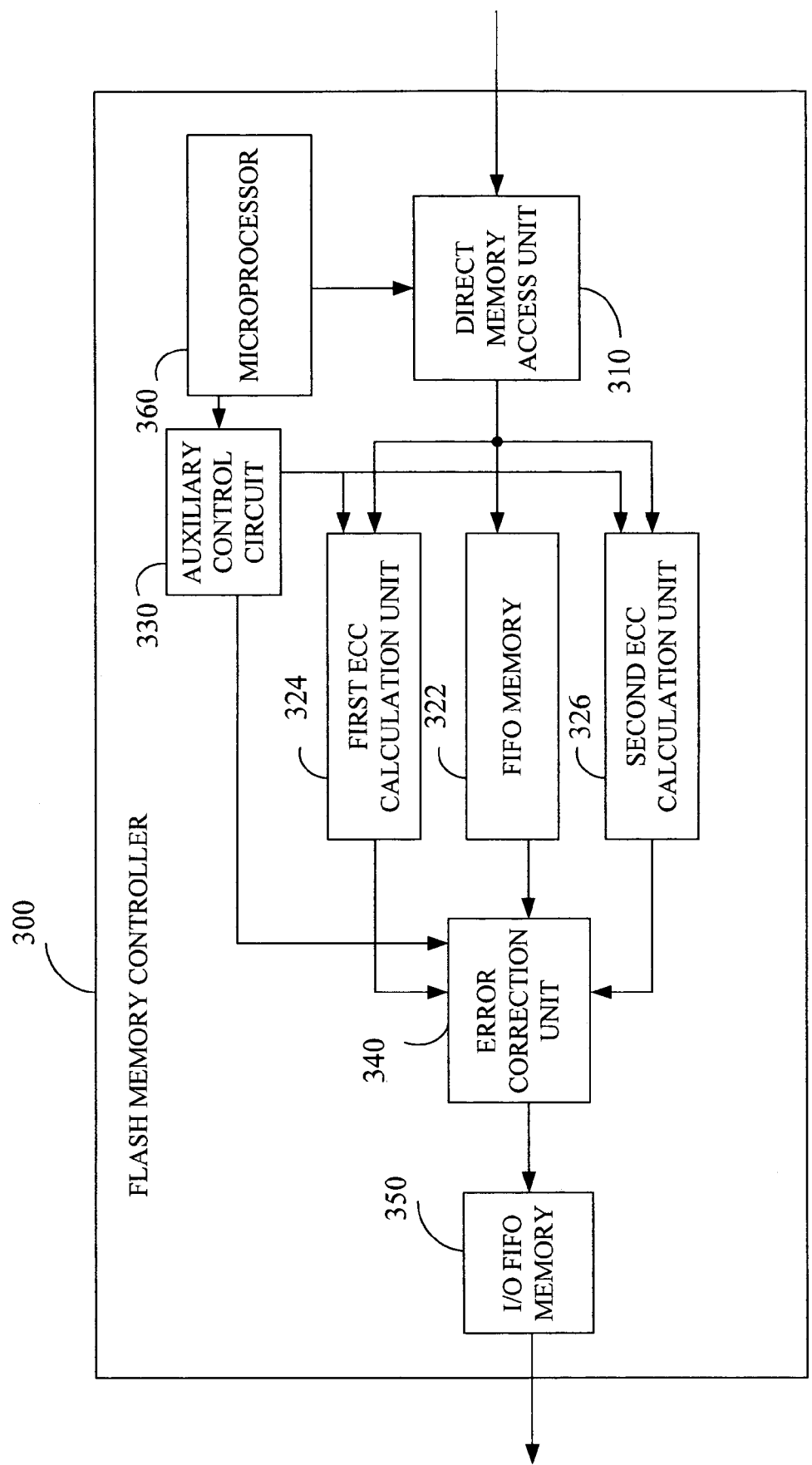
FIG. 3 shows a block diagram of the flash memory controller according to one embodiment of the present invention.
Figure 4:
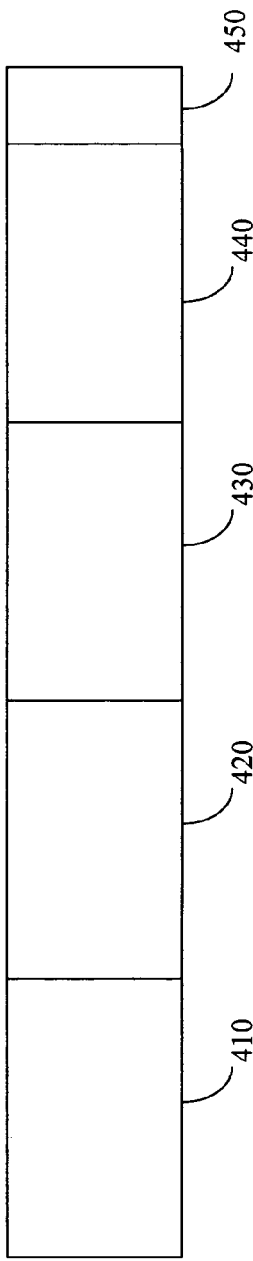
FIG. 4 shows the format of the memory page in FIG. 3.

With reference to FIG. 3, which shows a block diagram of a flash memory controller in accordance with the present invention, the flash memory controller 300 comprises a direct memory access unit 310, a FIFO memory 322, a first ECC calculation unit 324, a second ECC calculation unit 326, an auxiliary control circuit 330, an error correction unit 340, an I/O FIFO memory 350, and a microprocessor 360. The flash memory controller 300 can access a flash memory (not shown). For example, the 1 gigabit flash memory chip manufactured by Samsung Semiconductor Corp. has 128M bytes memory space, and comprises 1024 memory blocks, with each block having 64 memory pages. Each page is 2K+64 bytes, where 2K bytes are for storing data, and the 64 bytes are for the redundant area. The 2K+64 bytes allows flexible format. In this embodiment, the 40 bytes of the 64-byte redundant area is used for storing ECC, and the remaining 24 bytes are for storing other system information. In a preferred embodiment, as shown in FIG. 4, for each 2K+64 bytes, the first 2K+40 bytes are divided into 4 equal parts, and the last 24 bytes of the page store the system information. Therefore, the page 400 comprises 4 data memory areas 410, 420, 430, 440, and a system information area 450. Each data memory area is 512+10 bytes, wherein 512 bytes are for data, and the 10 bytes associate with ECC. The system information area has 24 bytes.

Referring to FIGS. 3 and 4, when the direct memory access unit 310 reads the 512 bytes of the data memory area 410 of the flash memory (not shown in FIGS. 3 and 4), the data is first stored in FIFO memory 322, and the entire 512+10 bytes of the data memory area 410 are provided to the first ECC calculation unit 324 for calculating the first syndrome. Then, the FIFO memory pushes the 512-byte data from the left to the error correction unit 340, while, at the same time, the direct memory access unit 310 reads the 512 bytes of the data memory area 420 of the flash memory (not shown in FIG. 3), the data is first stored in FIFO memory 322, and the entire 512+10 bytes of the data memory area 420 are provided to the second ECC calculation unit 326 for calculating the second syndrome. It should be noted that while reading the data memory area 420, the first ECC calculating unit 324 sends the first syndrome to the error correction unit 340 so that the 512-byte data sequentially output from the FIFO memory 322 can be corrected. The corrected 512-byte data is then stored in the I/O FIFO memory 350. Therefore, one data from data memory area 410 and another data from data memory area 420 are processed in parallel.

Furthermore, after the direct memory access unit 310 reads the 512+10 bytes of the data memory area 420, the FIFO memory 322 outputs the 512-byte data to the error correction unit 340, while, at the same time, the direct memory access unit 310 reads the 512 bytes of the data memory area 430 into FIFO memory 322, and the entire 512+10 bytes of the data memory area 430 are provided to the first ECC calculation unit 324 for calculating the first syndrome. Similarly, after the direct memory access unit 310 reads the 512+10 bytes of the data memory area 430, the FIFO memory 322 pushes the 512-byte data from the left to the error correction unit 340, while, at the same time, the direct memory access unit 310 reads the 512 bytes of the data memory area 434 into FIFO memory 322, and the entire 512+10 bytes of the data memory area 440 are provided to the second ECC calculation unit 326 for calculating the second syndrome. After reading the 512+10 bytes of the data memory area 440, the direct memory access unit 310 reads the last 24 bytes of system information area 450 in memory page 400. It should be noted that during the error correction unit 340 correcting the data memory area 440, the direct memory access unit 310 reads the system information area 450 in parallel. The parallel processing of reading current data while correcting previous data makes it possible for accessing the entire 2K bytes of data of the memory page 400 to be completed in 4 parallel processing times, wherein each 512-byte data is corrected and stored in the I/O FIFO memory 350 individually.

The error correction unit 340, alternatively, uses the first syndrome and the second syndrome to correct the 512-byte data in the FIFO memory 322. The error connection unit 340 is coupled to and controlled by the auxiliary control circuit 330 for selecting the first syndrome or the second syndrome as the input for error correction unit 340, which, for example, is implemented as an exclusive-or gate. The auxiliary control circuit 330 can be properly configured by the microprocessor 360. The direct memory access unit 310 is coupled to and controlled by the microprocessor 360.

Figure 5:
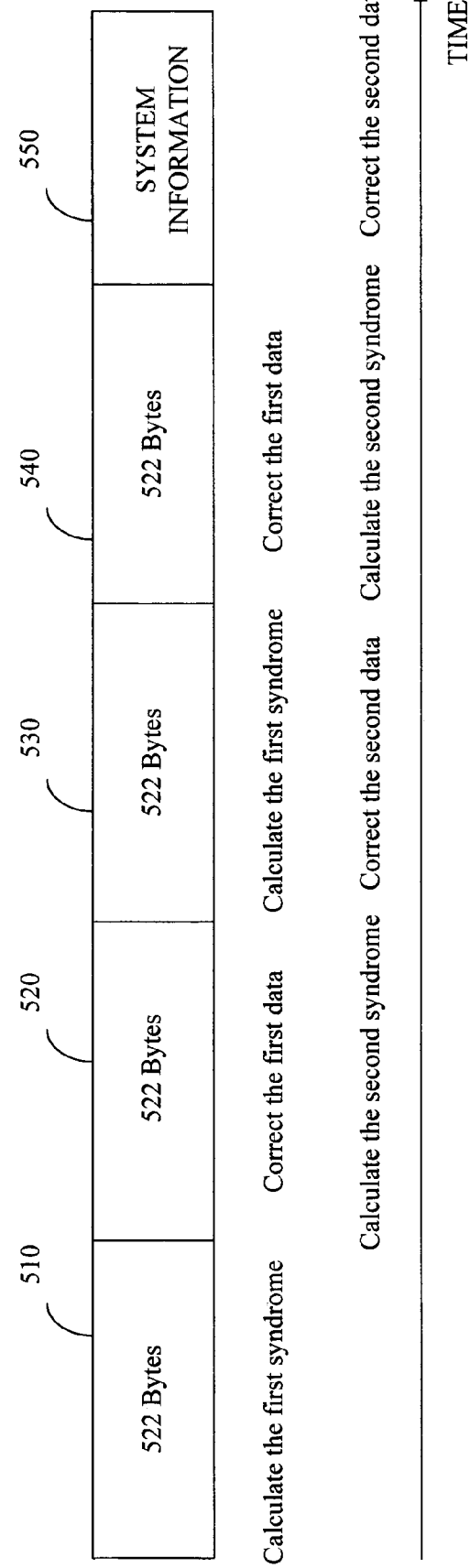
FIG. 5 shows an operation diagram in view of time according to the embodiment in FIG. 3.

FIG. 5 shows an operation diagram in view of time according to the embodiment shown in FIG. 3. For accessing 2K bytes of the same page, the operation shows that the access is performed in five phases, including accessing a plurality of data memory areas 510, 520, 530, 540, each having 512+10 bytes, and the system information area 550. 512-byte data corrected according to the first syndrome and 512-byte data corrected according to the second syndrome are designated as the first data and the second data, respectively. Preferably, the first data and the second data are temporarily stored in the FIFO memory 322. As described, the 522 bytes of the data memory area 510 are first read to calculate the first syndrome. Then, the 522 bytes of the data memory area 520 is read to calculate the second syndrome while the first data is corrected according to the first syndrome. Similarly, the 522 bytes of the data memory area 530 is read to calculate the first syndrome while the second data is corrected according to the second syndrome. Repeat the above steps till finishing accessing the entire 2K of a page, or a page with larger size.

A host, for example, reads data from a flash drive, which is so-called uploading. Preferably, downloading and uploading shares the same I/O FIFO memory 350. Downloading alternatively uses either the first ECC calculation unit 324, or the second ECC calculation unit 326 to generate the corresponding ECC for writing into the flash memory to make sure that the data is intact.

Figure 6:
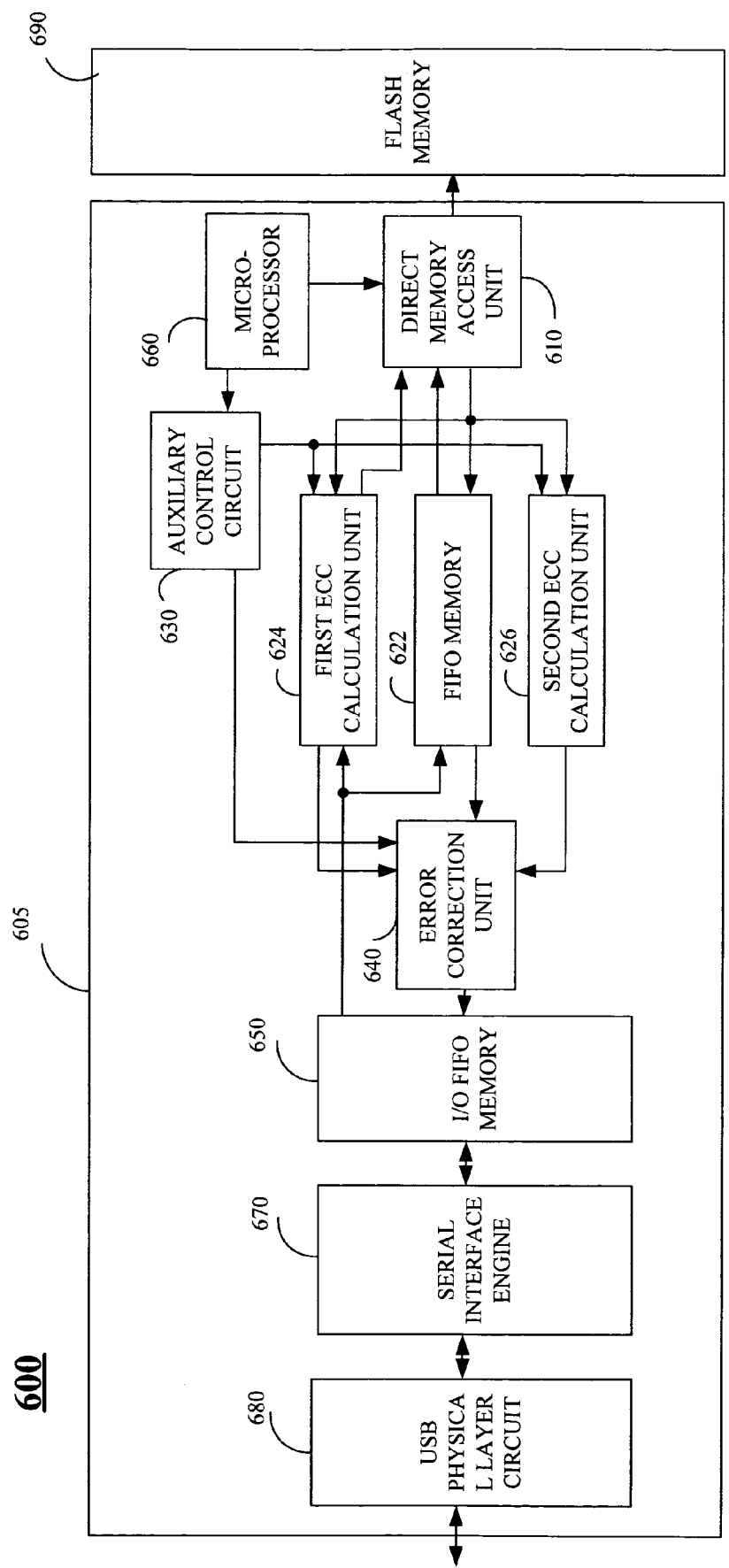
FIG. 6 shows a block diagram of the flash drive according to an embodiment of the present invention.

FIG. 6 shows a block diagram of a flash drive 600 according to one embodiment of the present invention. The flash drive 600 comprises a USB flash memory controller 605, and a flash memory 690. The flash memory controller 605 comprises a direct memory access unit 610, a FIFO memory 622, a first ECC calculation unit 624, a second ECC calculation unit 626, an auxiliary control circuit 630, an error correction unit 640, an I/O FIFO memory 650, a microprocessor 660, a serial interface engine 670, a USB physical layer circuit 680. The components interconnect as shown in FIG. 6. When uploading to the host, the direct memory access unit 610 reads data from the flash memory 690. While the FIFO memory 622 cooperates the first ECC calculation unit 624 and the second calculation unit 626 to calculate the syndromes in parallel utilizing the error correction unit 640, the corrected data is sent to the I/O FIFO memory 650, then to the serial interface engine 670, and the USB physical layer circuit 680, in order to generate the USB transmission signal. Preferably, the I/O FIFO memory 650 comprises a pair of FIFO memories (not shown) for ping-pong transmission. The error correction unit 640 is coupled to and controlled by the auxiliary control circuit 630 to alternatively apply the first ECC calculation unit 624 and the second calculation unit 626 as the input to the error correction unit 640. The auxiliary control circuit 630 can be configured by the microprocessor 660. The direct memory access unit 610 is also coupled to and controlled by the microprocessor 660. The microprocessor is coupled to a ROM and a RAM (not shown). The ROM stores the firmware for microprocessor's operation.

When downloading data from host to the flash drive 600, the data is sent through the USB physical layer circuit 680, the serial interface engine 670, and to the I/O FIFO memory 650. In this embodiment, the first ECC calculation unit 624 calculates the corresponding ECC code. Further, accompanying with the FIFO memory 622, the data and the ECC code are written into the flash memory 690 by the direct memory access unit 610.

While the invention has been described with reference to the preferred embodiment, it is to be understood that the invention does not intend to be limited to the disclosed embodiment. For example, in FIG. 4, the system information 450 is arranged in the last portion of the page 400. Alternatively, the system information can be uniformly arranged in each data memory area. And in FIG. 6, the downloading process uses the first ECC calculation unit 624 for generating the ECC code. Alternatively, the second ECC calculation unit 626 can also be used for generating the ECC code. Alternatively, the auxiliary control unit 630 can apply either the first ECC calculation unit 624, or the second ECC calculation unit 626 for ECC calculation, based on the state in the previous uploading phase.

Figure 7:
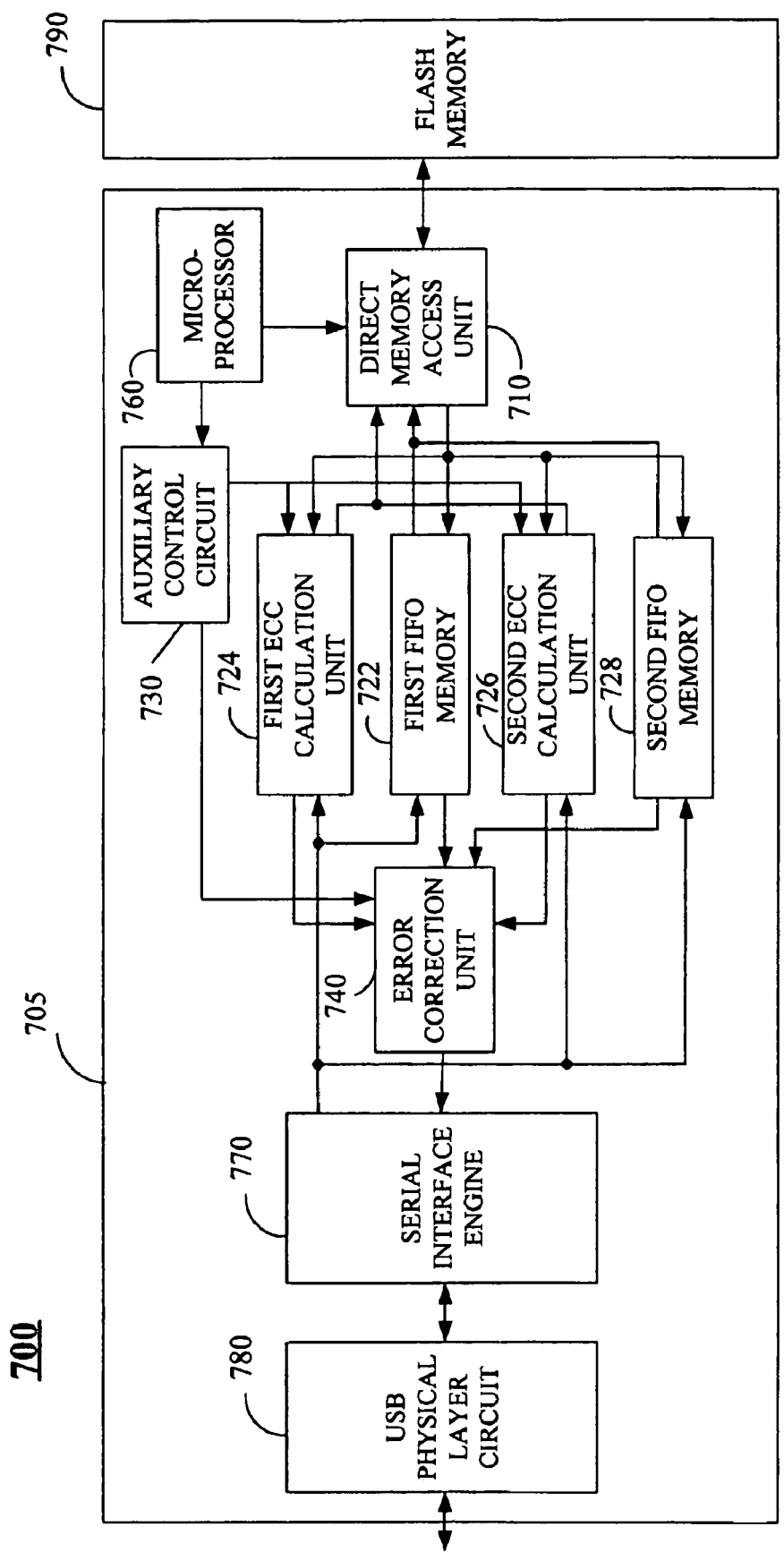
FIG. 7 shows a block diagram of the flash drive according to another embodiment of the present invention.

FIG. 7 shows a block diagram of a flash drive 700 according to another embodiment of the present invention. The flash drive 700 comprises a USB flash memory controller 705, and a flash memory 790. The flash memory controller 705 comprises a direct memory access unit 710, a first FIFO memory 722, a first ECC calculation unit 724, a second ECC calculation unit 726, a second FIFO memory 728, an auxiliary control circuit 730, an error correction unit 740, a microprocessor 760, a serial interface engine 770, and a USB physical layer circuit 780. As described earlier, the I/O FIFO 650 preferably comprises a pair of FIFO memories, with each having a width of 512 bytes. In this embodiment, the first FIFO memory 722 and the second FIFO memory 728 parallelly perform reading flash memory and calculating ECC. After the error correction unit 740, the output is directed to the serial interface engine 770, resulting in saving 512-byte memory than the previous embodiment.

When downloading data from host to the flash drive 700, the data is sent through the USB physical layer circuit 780, the serial interface engine 770, and to the alternative of the first FIFO memory 722 and the second FIFO memory 728 to form a ping-pong buffer. The first 512 bytes are stored in the first FIFO memory 722, and the first ECC calculation unit 724 generates associated 10-byte ECC code. The second 512 bytes are stored in the second FIFO memory 728, and the second ECC calculation unit 726 generates associated 10-byte ECC code. The data and the ECC code are written into the flash memory 790 by the direct memory access unit 710.

Figure 8:
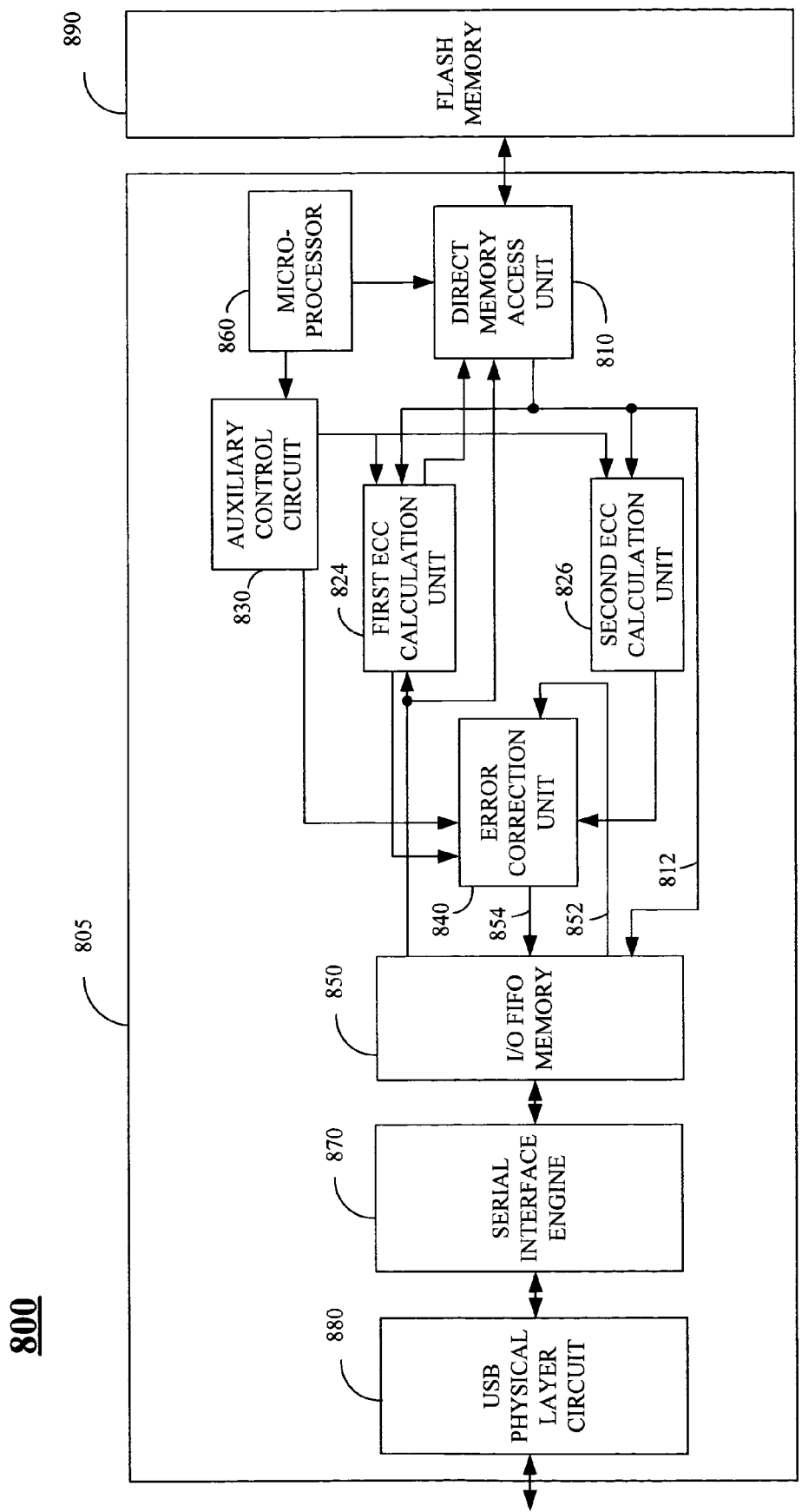
FIG. 8 shows a block diagram of the flash drive according to yet another embodiment of the present invention.

FIG. 8 shows a block diagram a flash drive 800 according to yet another embodiment of the present invention. The flash drive 800 comprises a USB flash memory controller 805, and a flash memory 890. The flash memory controller 805 comprises a direct memory access unit 810, a first ECC calculation unit 824, a second ECC calculation unit 826, an auxiliary control circuit 830, an error correction unit 840, an I/O FIFO memory 850, a microprocessor 860, a serial interface engine 870, and a USB physical layer circuit 880, interconnecting as FIG. 8. The difference between this embodiment and the previous embodiment in FIG. 6 mainly lies in that the first FIFO memory 622 is eliminated, and the I/O FIFO 850 preferably comprises a pair of FIFO memories, with each having a width of 512 bytes, to be used in parallel processing of reading flash memory and calculating ECC. When uploaded from the flash memory 890 to the host, the data go through the data bus 812 to be stored in the I/O FIFO memory 850. It is then read from the data bus 852, and takes turns applying the first ECC calculation unit 824 and the second ECC calculation unit 826 to read the data and calculate ECC in parallel. After the error correction unit 840 correcting the data from the data bus 852, the data is sent through the data bus 854 to the I/O FIFO memory 850 to perform a ping-pong transmission. Thus, 512-byte memory is saved in this embodiment, compared to the embodiment in FIG. 6.

When downloading data from host to the flash drive 800, the data is sent through the USB physical layer circuit 880, the serial interface engine 870, and to the I/O FIFO memory 850. In this embodiment, the first ECC calculation unit 824 generates associated ECC code. Data and associated ECC code is written into the flash memory 890 by the direct memory access unit 810. The ECC calculation unit 826 can also be used to generate said associated ECC code.

In summary, the present invention discloses an apparatus for parallelly processing the data and the ECC code in a memory. The device can be coupled to an external memory to access the memory. The device comprises a microprocessor, an auxiliary control circuit coupling with the microprocessor, a direct memory access unit, a FIFO memory, a first ECC calculation unit, a second ECC calculation unit, and an error correction unit. The direct memory access unit is coupled to the microprocessor for accessing the external memory. The FIFO memory is coupled to the direct memory access unit for temporarily storing the data. The first ECC calculation unit is coupled to the direct memory access unit and the auxiliary control circuit for outputting the first syndrome based on the data and the associated first ECC code. The second ECC calculation unit is also coupled to the direct memory access unit and the auxiliary control circuit. The error correction unit is coupled to the first ECC calculation unit, the second calculation unit, the auxiliary control circuit, and the FIFO memory. When the error correction unit corrects the data from the FIFO memory according to the first syndrome, the FIFO memory also receives the second data, and the second ECC calculation unit calculates the second syndrome based on the second data and associated second ECC code.

The present invention also discloses a USB controller, comprising a ROM pre-recording a firmware, a RAM, a microprocessor, a direct memory access unit, a FIFO memory, a first ECC calculation unit, a second ECC calculation unit, an error correction unit, an I/O FIFO memory, a serial interface engine, and a USB physical layer circuit. The microprocessor is coupled to the ROM and the RAM. The direct memory access unit is coupled to the non-volatile memory and the microprocessor for accessing the non-volatile memory. The FIFO memory is coupled to the direct memory access unit for temporarily storing data. The first ECC calculation unit is coupled to the direct memory access unit for generating the first syndrome based on the data and the associated first ECC code. The second ECC calculation unit is also coupled to the direct memory access unit. The error correction unit is coupled to the first ECC calculation unit, the second calculation unit, and the FIFO memory. The I/O FIFO memory is coupled to the error correction unit. The serial interface engine is coupled to the I/O FIFO memory, and the USB physical layer circuit is coupled to the serial interface engine for tranceiving the USB differential signal. When the error correction unit corrects the data from the FIFO memory according to the first syndrome, the controller reads another data from the non-volatile memory, and the second ECC calculation unit calculates the second syndrome based on the second data and associated second ECC code.

The present invention further discloses a USB flash drive, comprising a non-volatile memory and a controller. The controller is coupled to the non-volatile memory, and further comprises a ROM pre-recorded with firmware, a RAM, a microprocessor, a direct memory access unit, a FIFO memory, a first ECC calculation unit, a second ECC calculation unit, an error correction unit, an I/O FIFO memory, a serial interface engine, and a USB physical layer circuit. The microprocessor is coupled to the ROM and the RAM. The direct memory access unit is coupled to the non-volatile memory and the microprocessor for accessing the non-volatile memory. The FIFO memory is coupled to the direct memory access unit for temporarily storing data. The first ECC calculation unit is coupled to the direct memory access unit for generating the first syndrome based on the data and associated first ECC code. The second ECC calculation unit is also coupled to the direct memory access unit. The error correction unit is coupled to the first ECC calculation unit, the second calculation unit, and the FIFO memory. The I/O FIFO memory is coupled to the error correction unit. The serial interface engine is coupled to the I/O FIFO memory, and the USB physical layer circuit is coupled to the serial interface engine for tranceiving the USB differential signal. When the error correction unit corrects the data from the FIFO memory according to the first syndrome, the controller reads a second data from the non-volatile memory, and the second ECC calculation unit calculates the second syndrome based on the second data and associated second ECC code.

The present invention also discloses a method for parallelly processing data and ECC in the memory. The method comprises the following steps: reading the first data, and calculating the first syndrome based on the first data and the first ECC code; correcting the first data according to the first syndrome while reading the second data, and calculating the second syndrome based on the second data and the second ECC code; correcting the second data according to the second syndrome while reading the third data, and calculating the third syndrome based on the third data and the third ECC code.

While the invention has been described in connection with what is presently considered to the most practical and preferred embodiments, it is to be understood that the invention does not intend to be limited to the disclosed embodiments, but on the contrary, is intended to cover various modifications and equivalent arrangement included within the spirit and scope of the appended claims.

What is claimed is:

1. An apparatus for parallelly processing data and ECC, said apparatus being adapted to be coupled to an external memory, said apparatus comprising:
a microprocessor; an auxiliary control circuit coupled to said microprocessor; a direct memory access unit, coupled to said microprocessor for accessing said external memory; a first-in-first-out (FIFO) memory, coupled to said direct memory access unit; a first ECC calculation unit, coupled to said direct memory access unit and said auxiliary control circuit for calculating a first syndrome based on a first data and an associated first ECC; a second ECC calculation unit, coupled to said direct memory access unit and said auxiliary control circuit; and an error correction unit, coupled to said first ECC calculation unit, said auxiliary control circuit, said second ECC calculation unit, and said FIFO memory; wherein said FIFO memory receives a second data, and said second ECC calculation unit calculates a second syndrome based on said second data and an associated second ECC, while said error correction unit is correcting said first data in said FIFO memory according to said first syndrome.

2. The apparatus of claim 1, wherein said external memory is a flash memory.

3. The apparatus of claim 1, wherein said error correction unit alternatively applies said first syndrome and said second syndrome to correct the data in said FIFO memory.

4. The apparatus of claim 1 further comprising an I/O FIFO memory, coupled to said error correction unit for generating corrected data.

5. A controller, coupled to a non-volatile memory, for parallelly processing data and ECC in said non-volatile memory, said controller comprising:
a direct memory access unit, for accessing said non-volatile memory; a FIFO memory, coupled to said direct memory access unit for storing data; a first ECC calculation unit, coupled to said direct memory access unit for calculating a first syndrome based on a first data and an associated first ECC; a second ECC calculation unit, coupled to said direct memory access unit; and an error correction unit, coupled to said first ECC calculation unit, said second ECC calculation unit, and said FIFO memory; wherein said controller reads a second data and said second ECC calculation unit calculates a second syndrome based on said second data and an associated second ECC, while said error correction unit is correcting said first data in said FIFO memory according to said first syndrome.

6. The controller of claim 5, wherein said non-volatile memory is a flash memory.

7. The controller of claim 5, wherein said error correction unit alternatively applies said first syndrome and said second syndrome for correcting data in said FIFO memory.

8. The controller of claim 5, wherein said error correction unit is an exclusive-or gate.

9. The controller of claim 5, wherein said controller receives said first data from a host and writes said first data into said flash memory, and said I/O FIFO memory is further coupled to said FIFO memory and said first ECC calculation unit, said first ECC calculation unit calculates said associated first ECC based on said first data for said direct memory access unit to write said first data and said first ECC into said flash memory.

10. The controller of claim 5, wherein said controller receives said first data from a host to write said first data into said flash memory, and said I/O FIFO memory is further coupled to said FIFO memory, said first ECC calculation unit and said second ECC calculation unit, wherein the alternative of the said first ECC calculation unit and said second ECC calculation unit calculates an associated ECC based on data in said FIFO memory, for said direct memory access unit to write said data in said FIFO memory and said associated ECC into said flash memory.

11. A USB controller for parallelly processing data and ECC, coupled to a non-volatile memory, said USB controller comprising:
a microprocessor; a ROM, coupled to said microprocessor for storing a firmware for operating said microprocessor; a RAM, coupled to said microprocessor; an auxiliary control circuit coupled to said microprocessor; a direct memory access unit, coupled to said microprocessor for accessing said non-volatile memory; an I/O FIFO memory, coupled to said direct memory access unit for storing data; a first ECC calculation unit, coupled to said direct memory access unit and said auxiliary control circuit for calculating a first syndrome based on a first data and an associated first ECC; a second ECC calculation unit, coupled to said direct memory access unit and said auxiliary control circuit; an error correction unit, coupled to said first ECC calculation unit, said auxiliary control circuit, said second ECC calculation unit, and said FIFO memory; a serial interface engine, coupled to said I/O FIFO memory; and a USB physical layer circuit, coupled to said serial interface engine for connecting to a host; wherein said I/O FIFO memory receives a second data, and said second ECC calculation unit calculates a second syndrome based on said second data and an associated second ECC, while said error correction unit is correcting said first data according to said first syndrome, and then said corrected first data is stored back in said I/O FIFO memory.

12. The USB controller of claim 11, wherein said non-volatile memory is a flash memory.

13. The USB controller of claim 11, wherein said error correction unit alternatively applies said first syndrome and said second syndrome correcting said data.

14. The USB controller of claim 13, wherein said error correction unit is an exclusive-or gate.

* * * * *